United States Patent
Ishiguro et al.

(10) Patent No.: US 7,035,590 B2
(45) Date of Patent: Apr. 25, 2006

(54) MOBILE COMMUNICATION TERMINAL, INTERFERENCE CANCELLATION SYSTEM, INTERFERENCE CANCELLATION METHOD, AND BASE STATION

(75) Inventors: Takayuki Ishiguro, Yokosuka (JP); Toshiyuki Futakata, Yokosuka (JP); Makoto Ito, Yokosuka (JP); Sung Uk Moon, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 550 days.

(21) Appl. No.: 10/310,837

(22) Filed: Dec. 6, 2002

(65) Prior Publication Data

US 2003/0128679 A1    Jul. 10, 2003

(30) Foreign Application Priority Data

Dec. 6, 2001    (JP)    ............ P2001-373096

(51) Int. Cl.
  *H04B 1/10*    (2006.01)
  *H04B 15/00*   (2006.01)

(52) U.S. Cl. .................... 455/63.1; 455/67.13

(58) Field of Classification Search ............ 455/63.1, 455/443, 501, 67.13, 561; 370/342
See application file for complete search history.

(56) References Cited

U.S. PATENT DOCUMENTS 5,970,060 A  * 10/1999 Baier et al. ............ 370/342
6,034,986 A    3/2000 Yellin
6,041,237 A  *  3/2000 Farsakh ............. 455/450
6,301,289 B1 * 10/2001 Bejjani et al. ......... 375/144
2003/0053436 A1 * 3/2003 Li et al. .............. 370/342

FOREIGN PATENT DOCUMENTS

EP      0 876 002      11/1998
WO     WO 02/32003      4/2002

OTHER PUBLICATIONS

A. Klein, et al., IEEE Transactions on Vehicular Technology, vol. 45, No. 2, pp. 276-287, "Zero Forcing and Minimum Mean-Square-Error Equalization for Multiuser Detection in Code-Division Multiple-Access Channels", May 1996.

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

A mobile phone 1 receives a home cell signal sent from a base station B1 and a foreign cell signal sent from a base station B2 or from a mobile phone 21 in a foreign cell A2. The mobile phone 1 receives spreading codes C2–C4 sent from the base station B1, as home cell codes. The mobile phone 1 detects the interference between the home cell signal and the foreign cell signal. When the interference is detected, the mobile phone 1 receives a spreading code C1 sent from the base station B2 or from the mobile phone 21, as a foreign cell code. The mobile phone 1 cancels an interference signal by joint detection, using the home cell codes and the foreign cell code.

14 Claims, 3 Drawing Sheets

MOBILE COMMUNICATION TERMINAL, INTERFERENCE CANCELLATION SYSTEM, INTERFERENCE CANCELLATION METHOD, AND BASE STATION

BACKGROUND OF THE INVENTION

1. Field of the Invention

The present invention relates to a mobile communication terminal, an interference cancellation system, an interference cancellation method, and a base station.

2. Related Background Art

Conventionally, the TDD (Time Division Duplex) system is utilized as one of systems for substantializing two-way communications between mobile communication terminals like cellular phones and base stations. In the TDD system, uplink and downlink channels are switched over in the short period (e.g., 667 μs) whereby various signals are transmitted and received by making use of communication channels of the same frequency.

On the other hand, in the case where a mobile communication terminal is located in a reachable range of radio waves from a plurality of base stations, interference can occur between a signal from a base station in communication and signals from the other base stations. Interference occurs between a mobile communication terminal and a base station and also occurs between a plurality of mobile communication terminals. There is a proposal for Joint Detection as a technique of canceling such interference in the TDD system.

The Joint Detection is a process of calculating a demodulated signal D by a predetermined operational expression, based on received signal E received by the mobile communication terminal, spreading code C, and channel estimate H. The mobile communication terminal executes the Joint Detection upon reception of a signal to cancel the interference with the other mobile communication terminals or base stations present in the same cell. The Joint Detection is the technique that can also be applied to the CDMA (Code Division Multiple Access) system.

SUMMARY OF THE INVENTION

However, the prior art as described above had the following problem. Namely, signals from which interference is canceled by the Joint Detection are signals received within a communication area of a base station in communication with the mobile communication terminal (which will be referred to hereinafter as "home cell"). For example, in the case where the mobile communication terminal is located in an area in which the home cell is geographically overlapping with a cell except for the home cell (which will be referred to hereinafter as "foreign cell"), a signal sent from a base station of the foreign cell interferes with a signal sent from the base station of the home cell accordingly. This interference occasionally degraded the quality of signals that the mobile communication terminal received from the base station of the home cell.

The present invention has been accomplished in view of the above problem and an object of the invention is to provide a mobile communication terminal, an interference cancellation system, an interference cancellation method, and a base station capable of canceling the interference with the home cell and with the foreign cell to reduce the degradation of reception quality.

A mobile communication terminal according to the present invention is a mobile communication terminal configured to receive a home cell signal sent from a base station of a home cell and a foreign cell signal sent from a base station of a foreign cell or from a mobile communication terminal in the foreign cell, the mobile communication terminal comprising: home cell code receiving means for receiving a code sent from the base station of the home cell, as a home cell code; detecting means for detecting interference between the home cell signal and the foreign cell signal; foreign cell code receiving means for, when the detecting means detects the interference, receiving a code sent from the base station of the foreign cell or from the mobile communication terminal in the foreign cell, as a foreign cell code; and canceling means for canceling an interference signal by joint detection, using the home cell code received by the home cell code receiving means and the foreign cell code received by the foreign cell code receiving means.

An interference cancellation method according to the present invention is an interference cancellation method of canceling interference of a received signal when a mobile communication terminal receives a home cell signal sent from a base station of a home cell and a foreign cell signal sent from a base station of a foreign cell or from a mobile communication terminal in the foreign cell, the interference cancellation method comprising: a home cell code receiving step wherein the mobile communication terminal receives a code sent from the base station of the home cell, as a home cell code; a detecting step wherein the mobile communication terminal detects interference between the home cell signal and the foreign cell signal; a foreign cell code receiving step wherein when the interference is detected in the detecting step, the mobile communication terminal receives a code sent from the base station of the foreign cell or from the mobile communication terminal in the foreign cell, as a foreign cell code; and a canceling step wherein the mobile communication terminal cancels an interference signal by joint detection, using the home cell code received in the home cell code receiving step and the foreign cell code received in the foreign cell code receiving step.

According to the invention as described above, the mobile communication terminal is able to cancel the interference with the home cell signal and with the foreign cell signal to reduce the degradation of reception quality. Namely, the mobile communication terminal executes the joint detection, using the home cell code and the foreign cell code. Accordingly, the mobile communication terminal is able to cancel an interference signal from all signals received thereby. As a consequence, the reception quality is enhanced as compared with the case of canceling only the interference with the home cell signal. The invention as described above is particularly effective in the case where the mobile communication terminal is located in the area in which the home cell is geographically overlapping with the foreign cell, because interference is significant with the foreign cell in that case.

In the mobile communication terminal, preferably, the detecting means detects the interference when a reception level of the foreign cell signal received by the mobile communication terminal exceeds a predetermined value.

In the interference cancellation method, preferably, in the detecting step the mobile communication terminal detects the interference when a reception level of the foreign cell signal received by the mobile communication terminal exceeds a predetermined value.

According to the invention as described above, the mobile communication terminal detects the interference when the reception level of the foreign cell signal received by the mobile communication terminal exceeds the predetermined value. Namely, the interference is directly detected based on the reception level of the foreign cell signal as a target for cancellation of interference. Accordingly, it is feasible to detect the interference highly accurately and quickly.

In the mobile communication terminal, preferably, the detecting means detects the interference by a notification from the base station of the foreign cell through the base station of the home cell when a reception level of a signal sent from the mobile communication terminal and received by the base station of the foreign cell exceeds a predetermined value.

In the interference cancellation method, preferably, in the detecting step the mobile communication terminal detects the interference by a notification from the base station of the foreign cell through the base station of the home cell when a reception level of a signal sent from the mobile communication terminal and received by the base station of the foreign cell exceeds a predetermined value.

According to the invention as described above, the mobile communication terminal detects the interference by the notification from the base station of the foreign cell through the base station of the home cell when the reception level of the signal sent from the mobile communication terminal and received by the base station of the foreign cell exceeds the predetermined value. Accordingly, the mobile communication terminal does not have to perform the process of comparing the reception level with the predetermined value by itself. As a consequence, it is feasible to reduce the processing load on the mobile communication terminal.

Furthermore, in the mobile communication terminal, preferably, the foreign cell code receiving means receives the foreign cell code from the foreign cell signal.

Furthermore, in the interference cancellation method, preferably, in the foreign cell code receiving step the mobile communication terminal receives the foreign cell code from the foreign cell signal.

According to the invention as described above, the mobile communication terminal receives the foreign cell code from the foreign cell signal. Namely, the mobile communication terminal directly receives the foreign cell code used for cancellation of interference, from the foreign cell signal as a target for cancellation of interference. Accordingly, it is feasible to perform the interference cancellation processing highly accurately and quickly.

The mobile communication terminal, preferably, further comprises requesting means for requesting the foreign cell code from the base station of the foreign cell through the base station of the home cell, and the foreign cell code receiving means receives the foreign cell code requested by the requesting means, from the base station of the foreign cell through the base station of the home cell.

The interference cancellation method, preferably, further comprises a requesting step wherein the mobile communication terminal requests the foreign cell code from the base station of the foreign cell through the base station of the home cell, and in the foreign cell code receiving step the mobile communication terminal receives the foreign cell code requested in the requesting step, from the base station of the foreign cell through the base station of the home cell.

According to the invention as described above, the mobile communication terminal receives the foreign cell code sent according to the transmission request, from the base station of the foreign cell through the base station of the home cell. Accordingly, the mobile communication terminal does not have to perform the process of acquiring the foreign cell code from the foreign cell signal by itself. As a consequence, it is feasible to reduce the processing load on the mobile communication terminal.

Furthermore, the invention may also be applied to construction and operation of an interference cancellation system comprising the mobile communication terminal; and a base station of a home cell for sending the home cell signal to the mobile communication terminal, wherein communication is performed between the mobile communication terminal and the base station of the home cell.

A base station according to the present invention is a base station configured to receive a home cell signal sent from a mobile communication terminal in a home cell and a foreign cell signal sent from a base station of a foreign cell or from a mobile communication terminal in the foreign cell, the base station comprising: home cell code receiving means for receiving a code sent from the mobile communication terminal in the home cell, as a home cell code; detecting means for detecting interference between the home cell signal and the foreign cell signal; foreign cell code receiving means for, when the detecting means detects the interference, receiving a code sent from the base station of the foreign cell or from the mobile communication terminal in the foreign cell, as a foreign cell code; and canceling means for canceling an interference signal by joint detection, using the home cell code received by the home cell code receiving means and the foreign cell code received by the foreign cell code receiving means.

Another interference cancellation method according to the present invention is an interference cancellation method of canceling interference of a received signal when a base station receives a home cell signal sent from a mobile communication terminal in a home cell and a foreign cell signal sent from a base station of a foreign cell or from a mobile communication terminal in the foreign cell, the interference cancellation method comprising: a home cell code receiving step wherein the base station receives a code sent from the mobile communication terminal in the home cell, as a home cell code; a detecting step wherein the base station detects interference between the home cell signal and the foreign cell signal; a foreign cell code receiving step wherein when the interference is detected in the detecting step, the base station receives a code sent from the base station of the foreign cell or from the mobile communication terminal in the foreign cell, as a foreign cell code; and a canceling step wherein the base station cancels an interference signal by joint detection, using the home cell code received in the home cell code receiving step and the foreign cell code received in the foreign cell code receiving step.

According to the present invention, the base station is able to cancel the interference with the home cell signal and with the foreign cell signal to reduce the degradation of reception quality. Namely, the base station executes the joint detection, using the home cell code and the foreign cell code. Accordingly, it is feasible to cancel the interference signal from all signals received by the base station. As a consequence, the reception quality is enhanced as compared with the case of canceling only the interference with the home cell signal. The present invention is particularly effective in the case where a mobile communication terminal in communication with the base station of the foreign cell is located in the area in which the home cell is geographically overlapping with the foreign cell, because the interference is significant with the foreign cell in that case.

The invention may also be applied to construction and operation of an interference cancellation system comprising the base station; and a mobile communication terminal for sending the home cell signal to the base station, wherein communication is performed between the base station and the mobile communication terminal.

The present invention has succeeded in providing the mobile communication terminal, the interference cancellation system, and the interference cancellation method capable of canceling the interference with the home cell signal and with the foreign cell signal to reduce the degradation of reception quality. Namely, the mobile communication terminal executes the Joint Detection, using the home cell code and the foreign cell code. Accordingly, it is feasible to cancel the interference signal from all the signals received by the mobile communication terminal. As a consequence, the reception quality is improved as compared with the case of canceling only the interference with the home cell signal.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the present invention will be described below in detail with reference to the accompanying drawings.

Figure 1:
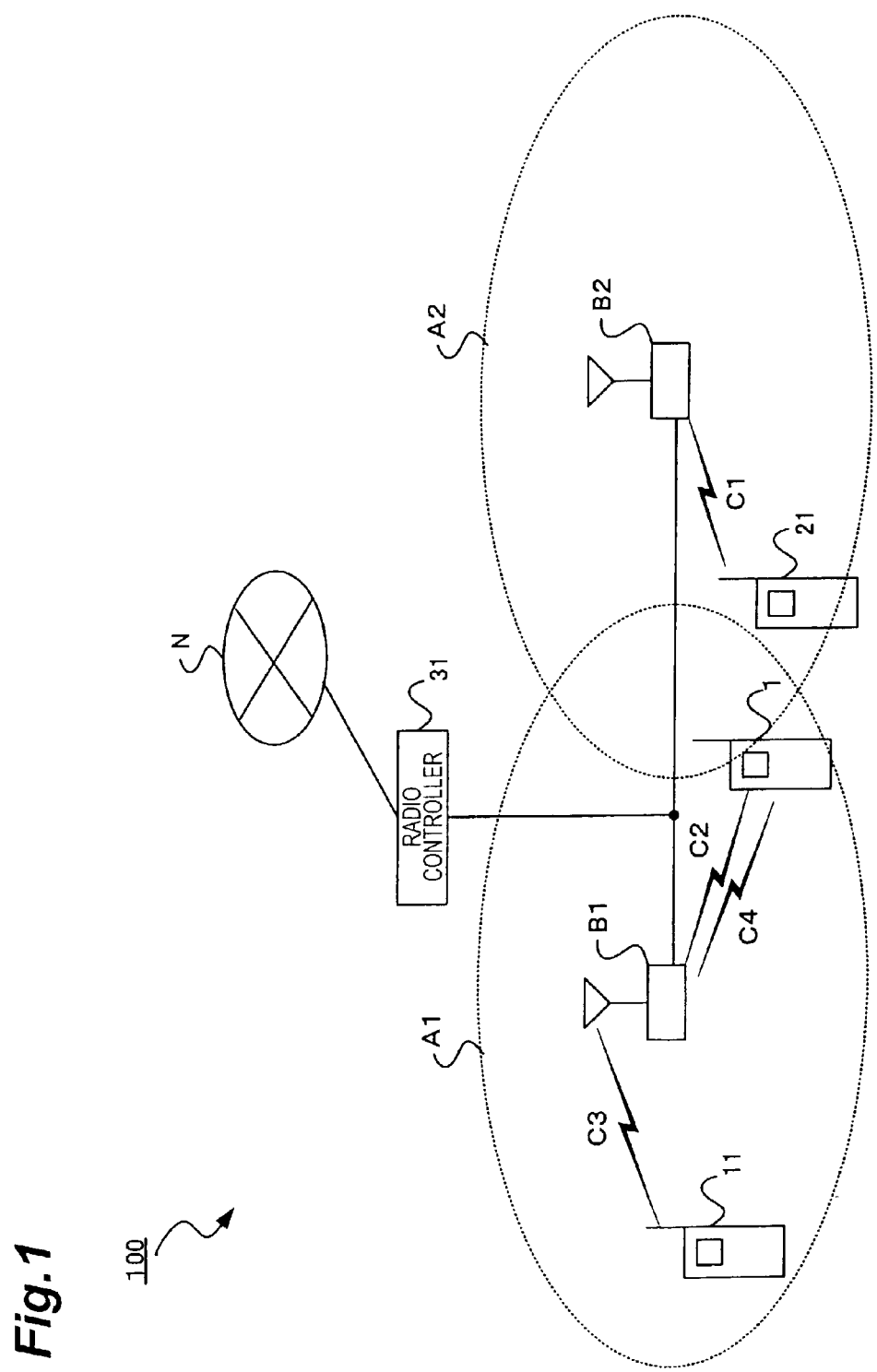
FIG. 1 is a schematic illustration showing the overall configuration example of the interference cancellation system according to the present invention.

The configuration will be described first. FIG. 1 is a schematic illustration showing an overall configuration example of interference cancellation system 100 in the present embodiment. As shown in FIG. 1, the interference cancellation system 100 is generally comprised of a mobile telephone 1 (corresponding to the mobile communication terminal), a mobile telephone 11, a mobile telephone 21 (corresponding to the mobile communication terminal in the foreign cell), a base station B1 (corresponding to the base station of the home cell), a base station B2 (corresponding to the base station of the foreign cell), and a radio controller 31.

A detailed description will be given later on about the internal structure, and the mobile phones 1, 11, 21 are cellular phones that users carry and use. The base station B1 is a public base station having the "home cell A1" as a reach of radio waves and configured to perform radio communications with the mobile phones 1, 11 located in the home cell A1. The base station B2 is a public base station having the "foreign cell A2" as a reach of radio waves and configured to perform radio communications with the mobile phone 21 located in the foreign cell A2. The radio controller 31 is a radio control unit configured to control radio communications between the mobile phones 1, 11, 21 and the base stations B1, B2 and wired to a packet communication network N.

A radio communication system between the mobile phones 1, 11 and the base station B1 and between the mobile phone 21 and the base station B2 is the known IMT-2000 CDMA TDD system. The IMT-2000 CDMA TDD system is a multiplexing system of communication channels based on IMT-2000 standardized by ITU (International Telecommunication Union). The IMT-2000 CDMA TDD system uses CDMA, TDMA (Time Division Multiple Access), and TDD, and the communication channels are divided by time and spreading codes.

In the IMT-2000 CDMA TDD system, one frame (e.g., 10 msec) is divided into fifteen timeslots on the time axis, and uplink communication channels and downlink communication channels are allocated to the respective timeslots. In the interference cancellation system 100, the mobile phones 1, 11, 21 perform transmission/reception using the same timeslots. Accordingly, signals transmitted and received by the mobile phones 1, 11, 21 are identified by spreading codes multiplexed on the respective uplink and downlink communication channels.

The mobile phone 1 establishes radio communication while receiving a signal sent from the base station B1 (which will be referred to hereinafter as "homecell signal"), which has a higher reception level than those of radio waves from the base station B2. The mobile phone 1 is located in an area where it also receives a signal sent from the base station B2 or from the mobile phone 21 (which will be referred to hereinafter as "foreign cell signal").

In the description hereinafter, a code for identifying a destination mobile phone in particular in the home cell signal (e.g., spreading codes C2–C4) will be referred to as "home cell code," and a code for identifying a destination mobile phone in particular in the foreign cell signal (e.g., spreading code C1) as "foreign cell code." The radio controller 31 is wired to the base station B1 and to the base station B2 so as to enable two-way communications.

Figure 2:
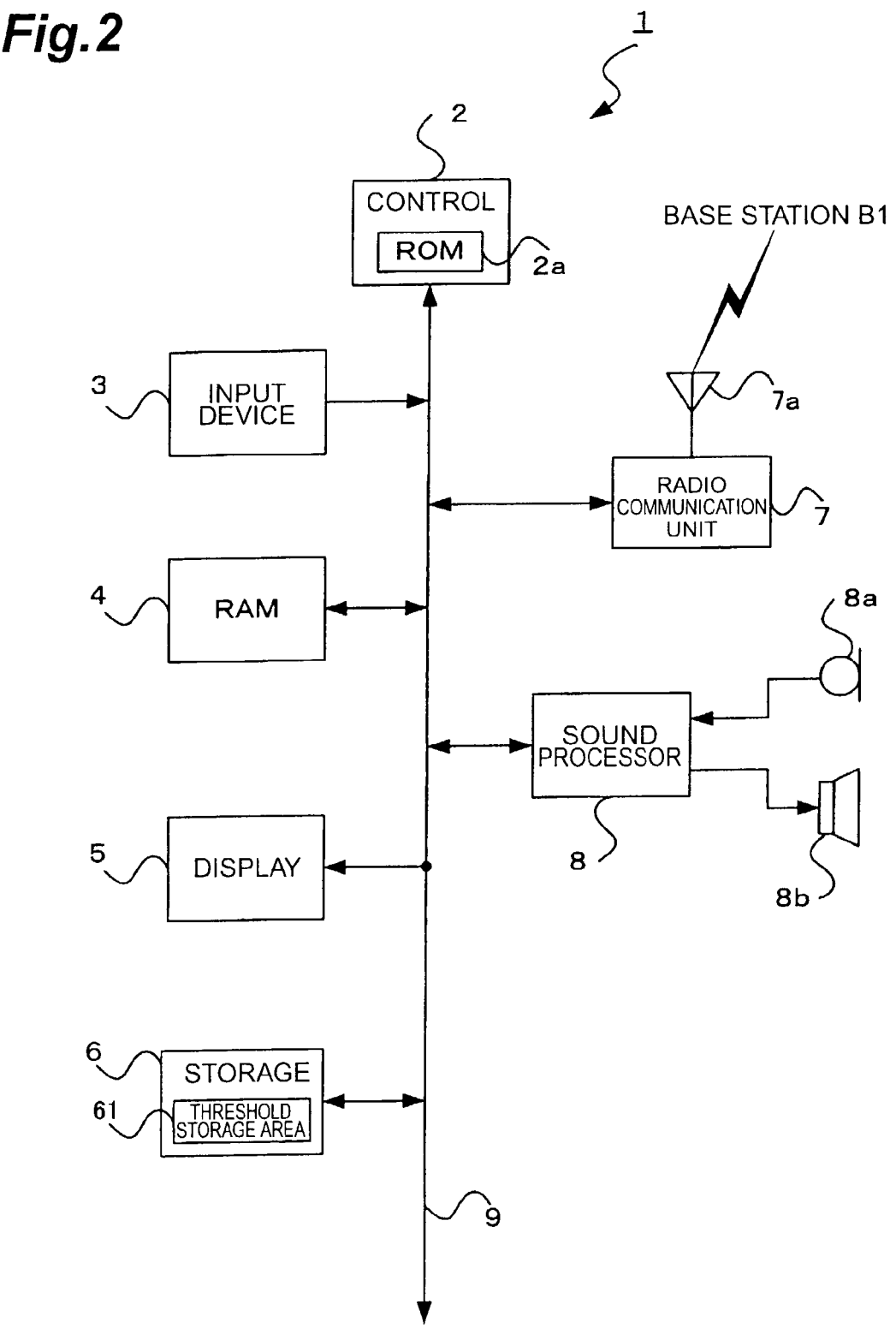
FIG. 2 is a block diagram showing the functional structure of the mobile phone.

The internal configuration of the mobile phone 1 will be detailed below with reference to FIG. 2. FIG. 2 is a block diagram showing the functional structure of the mobile phone 1. As shown in FIG. 2, the mobile phone 1 is comprised of a control unit 2 (corresponding to the detecting means, the canceling means, and the requesting means), an input unit 3, RAM 4, a display unit 5, a storage unit 6, a radio communication unit 7 (corresponding to the home cell code receiving means and the foreign cell code receiving means), and a sound processing unit 8, and the units are coupled so as to enable input/output of various signals through bus 9.

The control unit 2 incorporates ROM (Read Only Memory) 2a and works to read a program preliminarily stored in ROM 2a, into RAM 4 and perform central control over each of the units according to the program. Namely, the control unit 2 executes the interference cancellation processing (cf. FIG. 3), described later, according to an input signal from the input unit 3 and the program read into RAM 4, and temporarily stores the result of the processing in RAM 4. Thereafter, it stores the result of the processing stored in RAM 4, into a predetermined area inside the storage unit 6 as occasion may demand.

The input unit 3 is provided with various control buttons to give instructions of power ON/OFF, selection of function, etc., and a user depresses these various control buttons singly or in combination to output an input signal according to the instructions to the control unit 2.

The RAM (Random Access Memory) 4 is comprised of a volatile semiconductor memory, and is configured to temporarily store a program read out of ROM 2a and/or data read out of the storage unit 6, in various processes executed by the control unit 2. The RAM 4 also has a function of VRAM (Video RAM) for temporarily storing data to be displayed on the display unit 5.

The display unit 5 is comprised of LCD (Liquid Crystal Display), EL (Electro Luminescence), or the like, and is configured to present display of display data on a screen according to a display signal supplied from the control unit 2.

The storage unit 6 is comprised of a nonvolatile semiconductor memory like EEPROM (Electrically Erasable and Programmable ROM) and is configured to store data necessary for execution of various processes, data obtained as a result of execution of various processes, and so on.

The storage unit 6 has at least a threshold storage area 61. The threshold storage area 61 stores a threshold T (corresponding to the predetermined value) for the reception level of the foreign cell signal received by the mobile phone 1. This threshold data is numerical data used as a reference on the occasion of determining whether the mobile phone 1 is interfering with the base station B2 of the foreign cell or with the mobile phone 21.

The radio communication unit 7 performs control of radio communication with the base station B1.

The sound processing unit 8 is comprised of a converter, an amplifier, etc. and is provided with a microphone 8a and a speaker 8b. The sound processing unit 8 converts sound data from the control unit 2 into analog signals in the converter and emits a sound through the amplifier from the speaker 8b during calls. The sound processing unit 8 also converts sound signals from the microphone 8a into radio-communicable digital signals at the converter and outputs the digital signals to the control unit 2 during calls.

The above described the configuration of the mobile phone 1 according to the present invention. The major configurations of the mobile phones 11, 21 are similar to the configuration of the mobile phone 1 detailed above, and thus the illustration and detailed description of the configurations thereof are omitted herein.

Figure 3:
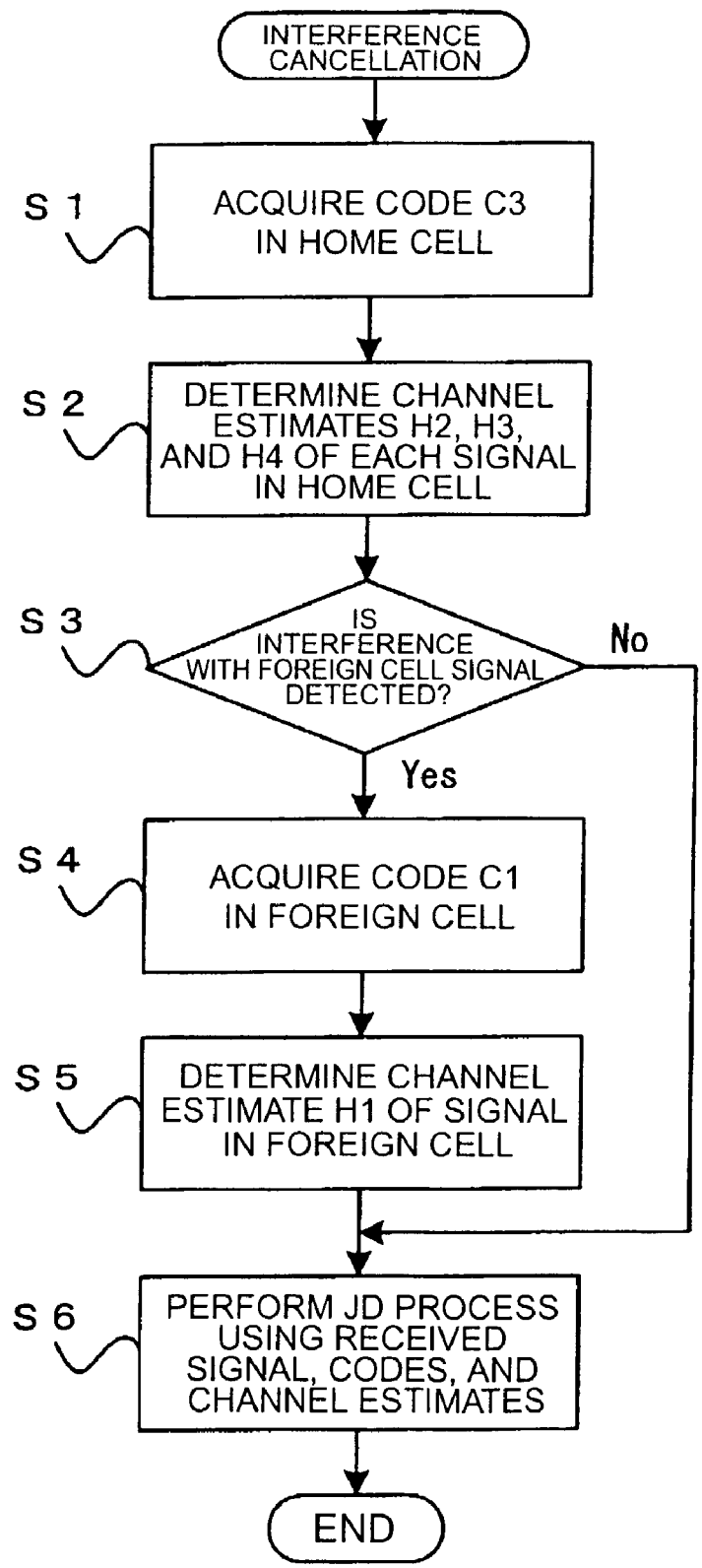
FIG. 3 is a flowchart showing the interference cancellation processing.

The operation in the present embodiment will be described below with reference to the flowchart of FIG. 3.

At the first step S1, the mobile phone 1 acquires the spreading code C3 in the home cell A1 used in the same timeslots. The acquisition of the spreading code is performed by measuring a time of a shift of a midamble multiplexed on each timeslot. Namely, in the home cell A1 the same midamble is allocated with shifts of different times to respective communication channels (transmission paths) Accordingly, the spreading codes are uniquely determined based on the times of the shifts.

At the next step S2, the mobile phone 1 determines channel estimates of signals transmitted and received in the home cell A1. A channel estimate is a matrix H satisfying E=H×D, where E is the received signal [e0,e1,e2, . . . ,et] and D the demodulated signal [d0,d1,d2, . . . ,dt], and is expressed by a sequence of numbers indicating a delay profile of each communication channel used in the home cell A1. The mobile phone 1 measures the channel estimates in the control unit 2, based on the midamble of each communication channel.

In the description hereinafter, let H3 be the channel estimate based on the spreading code C3 acquired at S1, and H2 and H4 be channel estimates based on the spreading codes C2, C4 preliminarily allocated to the mobile phone 1. It is noted that C2–C4 and H2–H4 are expressed by respective vectors.

At the next step S3, the mobile phone 1 detects the interference between the home cell signal and the foreign cell signal in the control unit 2. A method of the detection can be voluntarily determined and is preferably selected, for example, from three types of methods as described below.

The first method is a method of detecting the interference when the reception level of the foreign cell signal received from the base station B2 by the mobile phone 1 is not less than the threshold T for the reception level stored in the threshold storage area 61. The second method is a method of detecting the interference when the reception level of the foreign cell signal received from the mobile phone 21 by the mobile phone 1 is not less than the threshold T for the reception level stored in the threshold storage area 61. The third method is a method wherein when the reception level of the signal received from the mobile phone 1 by the base station B2 is not less than the threshold for the reception level stored in the base station B2, the interference is detected by a notification of the fact received by the mobile phone 1 through the base station B1.

When at S3 the mobile phone 1 detects the interference between the home cell signal and the foreign cell signal (S3; YES), the mobile phone 1 transfers to the next step S4. At S4, the mobile phone 1 acquires the spreading code C1 transmitted and received in the foreign cell A2, by means of the radio communication unit 7.

A method of acquiring the spreading code can be voluntarily determined and is preferably selected, for example, from two types of methods as described below. The first method is a method wherein the mobile phone 1 measures the time of the shift of the midamble multiplexed on timeslots of signals sent from the base station B2, to acquire the spreading code. The second method is a method wherein the mobile phone 1 receives the spreading code through the radio controller 31. Namely, the mobile phone 1 requests the spreading code from the base station B2 through the base station B1 and the radio controller 31. In response to this request, the base station B2 sends the spreading code through the radio controller 31 and the base station B1 to the mobile phone 1. The mobile phone 1 receives this spreading code.

At the next step S5, the mobile phone 1 determines the channel estimate of the signal transmitted and received in the foreign cell A2. The mobile phone 1 measures the channel estimate in the control unit 2, based on the midamble of the communication channel, as at S2 described above. In the description hereinafter, H1 will denote the channel estimate based on the spreading code C1 acquired at S4. It is noted that C1 and H1 are expressed by respective vectors.

At the last step S6, the mobile phone 1 executes the Joint Detection (the JD process in the figure) for obtaining the demodulated signal. The Joint Detection is performed using a signal received from any sender, the spreading codes C1–C4, and the channel estimates H1–H4. The Joint Detection is executed according to the method described in the following research report by Anja Klein, for example. The title of the research report, and the name of Document are "Zero Forcing and Minimum Mean-Square-Error Equalization for Multiuser Detection in Code-Division Multiple Access Channel" (IEEE TRANSACTIONS ON VEHICULAR TECHNOLOGY, VOL. 45, NO. 2, MAY 1996, PP.276–287).

The Joint Detection is the known interference cancellation technology as described above and the detailed description thereof is thus omitted herein. The following will outline the technology. First, B is calculated according to C×H (where × represents the convolution operator), based on the spreading code C and the channel estimate H. This yields B1=C1×H1, B2=C2×H2, B3=C3×H3, and B4=C4×H4. Then the channel estimation matrix A is created from B1–B4. The demodulated signal D is calculated by a solution to the operational expression $(A^H A+\sigma^2 I)D=A^H E$ using the received signal E and the channel estimation matrix A. In the above expression, $A^H$ is a transpose of the channel estimation matrix A, $\sigma$ a coefficient for removal of thermal noise, and I a unit matrix. In the IMT-2000 CDMA TDD system, the maximum of spreading factors, which are lengths of Cn, is 16, and the size of the channel estimation matrix A can be smaller than in the IMT-2000 CDMA FDD (Frequency Division Duplex) system and others, thus making it feasible to reduce the computational complexity. Accordingly, the interference cancellation technology can be applied relatively easily.

When at S3 the mobile phone 1 detects no interference between the home cell signal and the foreign cell signal (S3; NO), it skips the processes at the respective steps S4-S5 and goes to S6. In this case, the Joint Detection at S6 is executed using only the spreading codes C2–C4 and the channel estimates H2–H4, without using the spreading code C1 and the channel estimate H1.

As described above, the mobile phone 1 receives the home cell signal sent from the base station B1 and the foreign cell signal sent from the base station B2 or from the mobile phone 21 in the foreign cell A2. The mobile phone 1 is equipped at least with the control unit 2 and the radio communication unit 7. The radio communication unit 7 receives the spreading codes C2–C4 sent from the base station B1, as home cell codes. The control unit 2 detects interference between the home cell signal and the foreign cell signal. When the interference is detected, the radio communication unit 7 receives the spreading code C1 sent from the base station B2 or from the mobile phone 21, as a foreign cell code. The control unit 2 cancels the interference signal from all the signals received by the mobile phone 1, by the Joint Detection, using the home cell code and the foreign cell code. Therefore, the mobile phone 1 is able to cancel the interference with the home cell signal and the interference with the foreign cell signal. As a consequence, it becomes feasible to reduce the degradation of reception quality.

The form described in the above embodiment is just a preferred example of the interference cancellation system according to the present invention, and the invention is not limited to this example.

For example, while the above embodiment was the example in which the mobile phone 1 executed a series of interference cancellation processing, the base station B1 may execute it. In this case, however, the objects for the interference cancellation processing in the home cell are not the mobile phone 11 and the base station B1, but are the mobile phones 1, 11. Namely, the base station B1 executes the Joint Detection, using the signals received from the mobile phones is 1, 11, as home cell signals and using the signals received from the mobile phone 21 and the base station B2, as foreign cell signals.

The above embodiment described the mobile communication terminals being the mobile phones, but the mobile communication terminals may be any information equipment provided with the radio communication function, for example, like PHS (Personal Handyphone System).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal configured to receive a home cell signal sent from a base station of a home cell and a foreign cell signal sent from a base station of a foreign cell or from a mobile communication terminal in said foreign cell, the mobile communication terminal comprising:
   home cell code receiving means for receiving a code sent from the base station of the home cell, as a home cell code;
   detecting means for detecting interference between the home cell signal and the foreign cell signal;
   foreign cell code receiving means for, when said detecting means detects the interference, receiving a code sent from the base station of the foreign cell or from the mobile communication terminal in the foreign cell, as a foreign cell code; and
   canceling means for canceling an interference signal by joint detection, using the home cell code received by said home cell code receiving means and the foreign cell code received by said foreign cell code receiving means.

2. The mobile communication terminal according to claim 1, wherein said detecting means detects the interference when a reception level of said foreign cell signal received by the mobile communication terminal exceeds a predetermined value.

3. The mobile communication terminal according to claim 1, wherein said detecting means detects the interference by a notification from the base station of the foreign cell through the base station of the home cell when a reception level of a signal sent from the mobile communication terminal and received by the base station of the foreign cell exceeds a predetermined value.

4. The mobile communication terminal according to claim 1, wherein said foreign cell code receiving means receives the foreign cell code from the foreign cell signal.

5. The mobile communication terminal according to claim 1, further comprising requesting means for requesting the foreign cell code from the base station of the foreign cell through the base station of the home cell,
   wherein said foreign cell code receiving means receives the foreign cell code requested by said requesting means, from the base station of the foreign cell through the base station of the home cell.

6. An interference cancellation system comprising the mobile communication terminal as set forth in claim 1; and a base station of a home cell for sending the home cell signal to the mobile communication terminal,
   wherein communication is performed between the mobile communication terminal and the base station of the home cell.

7. An interference cancellation method of canceling interference of a received signal when a mobile communication terminal receives a home cell signal sent from a base station of a home cell and a foreign cell signal sent from a base station of a foreign cell or from a mobile communication terminal in the foreign cell, the interference cancellation method comprising:

a home cell code receiving step wherein the mobile communication terminal receives a code sent from the base station of the home cell, as a home cell code;

a detecting step wherein the mobile communication terminal detects interference between the home cell signal and the foreign cell signal;

a foreign cell code receiving step wherein when the interference is detected in the detecting step, the mobile communication terminal receives a code sent from the base station of the foreign cell or from the mobile communication terminal in the foreign cell, as a foreign cell code; and a canceling step wherein the mobile communication terminal cancels an interference signal by joint detection, using the home cell code received in the home cell code receiving step and the foreign cell code received in the foreign cell code receiving step.

8. The interference cancellation method according to claim 7, wherein in said detecting step the mobile communication terminal detects the interference when a reception level of the foreign cell signal received by the mobile communication terminal exceeds a predetermined value.

9. The interference cancellation method according to claim 7, wherein in said detecting step the mobile communication terminal detects the interference by a notification from the base station of the foreign cell through the base station of the home cell when a reception level of a signal sent from the mobile communication terminal and received by the base station of the foreign cell exceeds a predetermined value.

10. The interference cancellation method according to claim 7, wherein in said foreign cell code receiving step the mobile communication terminal receives the foreign cell code from the foreign cell signal.

11. The interference cancellation method according to claim 7, further comprising a requesting step wherein the mobile communication terminal requests the foreign cell code from the base station of the foreign cell through the base station of the home cell, wherein in the foreign cell code receiving step the mobile communication terminal receives the foreign cell code requested in the requesting step, from the base station of the foreign cell through the base station of the home cell.

12. A base station configured to receive a home cell signal sent from a mobile communication terminal in a home cell and a foreign cell signal sent from a base station of a foreign cell or from a mobile communication terminal in said foreign cell, the base station comprising:

home cell code receiving means for receiving a code sent from the mobile communication terminal in the home cell, as a home cell code;

detecting means for detecting interference between the home cell signal and the foreign cell signal;

foreign cell code receiving means for, when said detecting means detects the interference, receiving a code sent from the base station of the foreign cell or from the mobile communication terminal in the foreign cell, as a foreign cell code; and canceling means for canceling an interference signal by joint detection, using the home cell code received by said home cell code receiving means and the foreign cell code received by said foreign cell code receiving means.

13. An interference cancellation system comprising the base station as set forth in claim 12; and a mobile communication terminal for sending the home cell signal to the base station, wherein communication is performed between the base station and the mobile communication terminal.

14. An interference cancellation method of canceling interference of a received signal when a base station receives a home cell signal sent from a mobile communication terminal in a home cell and a foreign cell signal sent from a base station of a foreign cell or from a mobile communication terminal in the foreign cell, the interference cancellation method comprising:

a home cell code receiving step wherein the base station receives a code sent from the mobile communication terminal in the home cell, as a home cell code;

a detecting step wherein the base station detects interference between the home cell signal and the foreign cell signal;

a foreign cell code receiving step wherein when the interference is detected in the detecting step, the base station receives a code sent from the base station of the foreign cell or from the mobile communication terminal in the foreign cell, as a foreign cell code; and a canceling step wherein the base station cancels an interference signal by joint detection, using the home cell code received in the home cell code receiving step and the foreign cell code received in the foreign cell code receiving step.

* * * * *